(12) United States Patent
Watanabe (10) Patent No.: US 12,052,485 B2
(45) Date of Patent: Jul. 30, 2024

(54) ELECTRONIC APPARATUS

(71) Applicant: CANON KABUSHIKI KAISHA, Tokyo (JP)

(72) Inventor: Shinsaku Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 17/974,457

(22) Filed: Oct. 26, 2022

(65) Prior Publication Data
US 2023/0179848 A1    Jun. 8, 2023

(30) Foreign Application Priority Data
Dec. 7, 2021 (JP) ................. 2021-198575

(51) Int. Cl.
*H04N 23/54* (2023.01)
*H04N 23/55* (2023.01)

(52) U.S. Cl.
CPC ............ *H04N 23/54* (2023.01); *H04N 23/55* (2023.01)

(58) Field of Classification Search
None
See application file for complete search history.

(56) References Cited

U.S. PATENT DOCUMENTS

2020/0355990 A1* 11/2020 Endo .................. H04N 23/51

FOREIGN PATENT DOCUMENTS

JP     5393681 B2    1/2014

* cited by examiner

*Primary Examiner* — Mark T Monk
(74) *Attorney, Agent, or Firm* — Cowan, Liebowitz & Latman, P.C.

(57) ABSTRACT

In an electronic apparatus using the Molded Interconnect Device technology, a circuit member includes a fastened portion, to which the fastening member is fixed, and a plurality of convex portions arranged in an approximately circular shape around the fastened portion as a center. Each of the plurality of convex portions has a first contact pattern. A substrate has a hole portion into which the fastening member is inserted. The substrate has a plurality of second contact patterns arranged in an approximately circular shape on the substrate around the hole portion as a center so that each of the second contact patterns faces a corresponding one of the first contact patterns. The first contact patterns and the second contact patterns are brought into contact with each other by fixing the fastening member to the fastened portion through the hole portion.

14 Claims, 10 Drawing Sheets

ELECTRONIC APPARATUS

BACKGROUND

Technical Field

One of the aspects of the disclosure relates generally to an electronic apparatus having a circuit board (substrate), and more particularly to an electronic apparatus using the Molded Interconnect Device (MID) technology.

Description of the Related Art

Various circuit boards are mounted on an electronic apparatus. Inside the electronic apparatus, circuit boards are connected to one another using connectors such as a cable and a flexible printed circuit (FPC). The connector connection work using a robot-automated assembly apparatus has recently been well-known, but a small electronic apparatus needs to secure a space and improve its performance for flip-opening/closing of a connector and insertion of the FPC.

A structure in which the FPCs having contacts are brought into contact with each other by fastening screws has been known as a structure for connecting circuit boards without any connectors. However, this structure needs a separate pressing member in order to apply uniform contact pressure to these contacts.

The MID technology has been known. The MID technology is a technology of irradiating a laser onto a required portion of a base member and forming a metal plating coating only on the irradiated portion. The portion coated with the metal plating serves as a conductive pattern.

Japanese Patent No. ("JP") 5393681 discloses a structure that connects circuit boards to each other using contacts formed on the circuit boards by the MID technology.

However, the structure disclosed in JP 5393681 has a conductive adhesive or a clip member between the contacts, and may increase the number of components, cause a complicated structure, and apply different contact pressure to each of the contacts.

SUMMARY

The disclosure provides an electronic apparatus having a contact structure that can make contact with uniform contact pressure using a simple structure.

An electronic apparatus using the Molded Interconnect Device technology according to one aspect of the disclosure includes a circuit member, a substrate, and a fastening member that fixes the substrate to the circuit member. The circuit member includes a base portion having a conductive pattern, a fastened portion provided on the base portion, to which the fastening member is fixed, and a plurality of convex portions arranged in an approximately circular shape around the fastened portion as a center on the base portion. Each of the plurality of convex portions has a first contact pattern. The substrate has a hole portion into which the fastening member is inserted. The substrate has a plurality of second contact patterns arranged in an approximately circular shape on the substrate around the hole portion as a center so that each of the second contact patterns faces a corresponding one of the first contact patterns. The first contact patterns and the second contact patterns are brought into contact with each other by fixing the fastening member to the fastened portion through the hole portion.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure. Here, a lens interchangeable type digital camera will be used for an image pickup apparatus according to the disclosure.

First Embodiment

Referring now to FIGS. 1A to 7, a description will be given of a first embodiment.

Figure 1A:
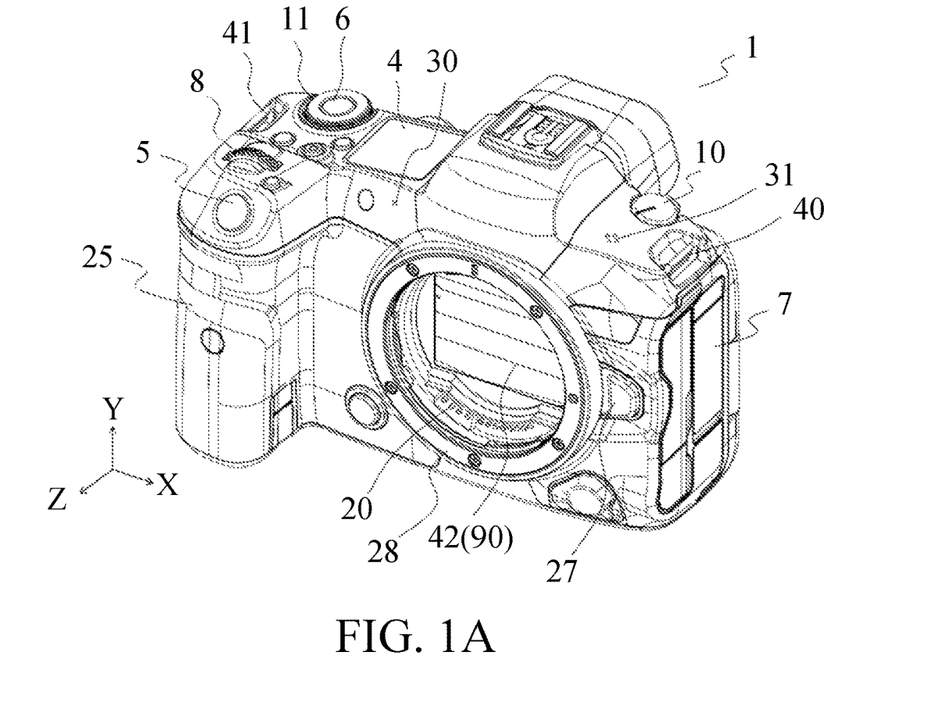
FIGS. 1A and 1B explain an image pickup apparatus according to a first embodiment.
Figure 1B:
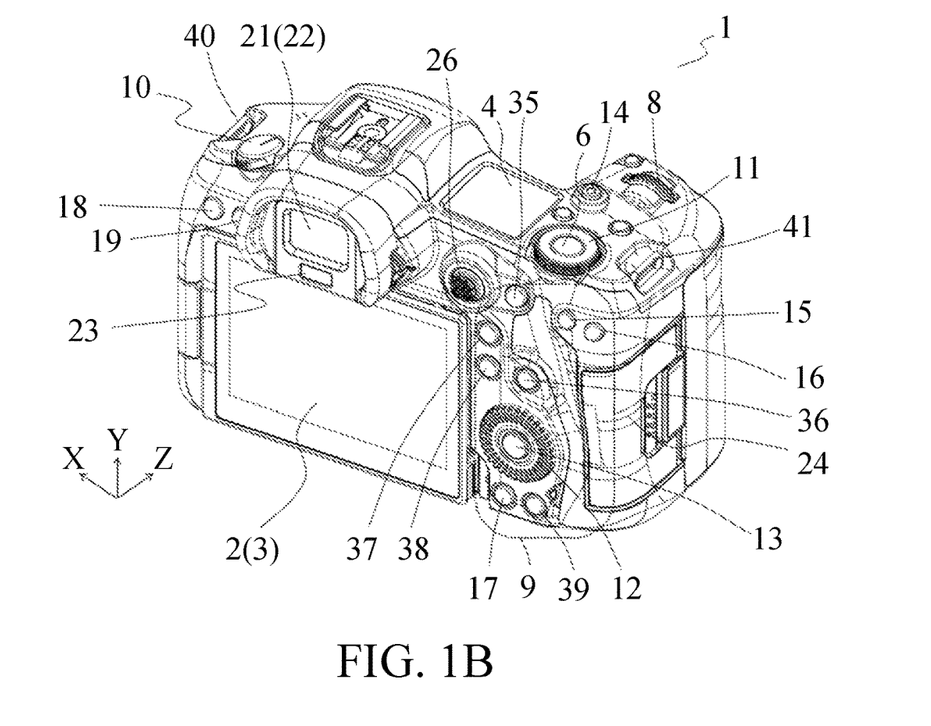

FIGS. 1A and 1B explain an image pickup apparatus 1 as an electronic apparatus according to this embodiment. FIG. 1A is a perspective view of the image pickup apparatus 1 viewed from the front, and FIG. 1B is a perspective view of the image pickup apparatus 1 viewed from the rear.

In FIG. 1B, a display unit 2 is a display unit provided to the image pickup apparatus 1 and configured to display an image and various information. A touch panel 3 can detect a touch operation on a display surface (operation surface) of the display unit 2.

A non-finder display unit 4 is a display unit provided on the top surface of the image pickup apparatus 1 and configured to display various setting values of the image pickup apparatus 1, including a shutter speed and F-number (aperture value).

A shutter button 5 is an operation unit for instructing imaging. A mode switch 6 is an operation unit for switching various modes.

A terminal cover 7 is a cover that protects a connector (not illustrated) such as a connection cable that connects a connection cable of an external device and the image pickup apparatus 1 to each other.

A main electronic dial 8 is a rotary operation member, and rotating the main electronic dial 8 can change a set value, such as a shutter speed and an F-number, and the like.

A power switch 10 is an operation member that switches power-on and power-off of the image pickup apparatus 1.

A sub-electronic dial 11 is a rotary operation member, and can be used to move a selection frame, feed an image, and the like.

An operation unit 9 is formed on the back side of the image pickup apparatus 1. The operation unit 9 includes a plurality of press buttons and an operation dial 12. The operation dial 12 is a rotary operation member, and rotating the operation dial 12 can change a set value, such as a shutter speed and an F-number, and the like. A SET button 13 is a press button and is mainly used to determine an item to be selected. A selection member 26 is a cross key (four-direction key) whose upper, lower, left, and right portions can be pressed. An operation corresponding to the pressed portion of the selection member 26 is available.

A moving image button 14 is used to instruct the start and stop of motion imaging (recording).

Pressing an auto-exposure (AE) lock button 15 in an imaging standby state can fix an exposure state.

An autofocus (AF) position switching button 16 can be used to select and move an AF frame.

Pressing an AF ON button 35 in the imaging standby state can focus on the set AF frame.

In a case where a setting switching button 36 is pressed in the imaging standby state, an imaging condition changing menu is displayed on the display unit 2 or an electronic viewfinder (EVF) 22 and can be selected, and various imaging conditions such as an exposure state and a white balance state can be changed.

An enlarging button 37 is an operation button for turning on and off an enlargement mode in a live-view (LV) display of the imaging mode. By turning on the enlargement mode and then operating the main electronic dial 8, an LV image can be enlarged or reduced. The enlarging button 37 functions as an enlarging button for enlarging a playback image and increasing an enlargement ratio in the playback mode.

Pressing an information button 38 in the playback mode can play back and display information of recorded data.

A playback button 17 is an operation button for switching between the imaging mode and the playback mode. Pressing the playback button 17 in the imaging mode transfers the current mode to the playback mode, and can display the latest image among images recorded in a recording medium (not illustrated) on the display unit 2.

Pressing the erase button 39 can erase selected recorded data in the playback mode.

A menu button 19 is a press button, and pressing the menu button 19 can display a menu screen on which various settings can be made, on the display unit 2. The user can intuitively perform various settings using the menu screen displayed on the display unit 2, the operation dial 12, and the SET button 13.

A rating button 18 is a press button, and pressing the rating button 18 in the playback mode can add flag information to the selected recorded data.

A microphone (not illustrated) is disposed inside a microphone hole 30 and is used to record voice data of an object during moving image capturing.

A speaker (not illustrated) is disposed inside a speaker hole 31 and is used to play the sound of recorded data and the built-in sound of the image pickup apparatus 1.

An eyepiece unit 21 is an eyepiece finder (peep type finder), and the user can visually recognize an image displayed on the internal EVF 22 through the eyepiece unit 21.

An eyepiece detecting unit 23 is an eyepiece detecting sensor that detects whether or not the photographer is eyeing the eyepiece unit 21.

A lid 24 is a lid of a slot in which the recording medium (not illustrated) is stored.

A grip portion 25 is a holding portion shaped so that the user can easily hold it with his right hand in holding the image pickup apparatus 1. The shutter button 5 and the main electronic dial 8 are disposed at positions that can be operated with the index finger of the right hand while the image pickup apparatus 1 is held by gripping the grip portion 25 with the little finger, the ring finger, and the middle finger of the right hand. In the same state, the sub-electronic dial 11 and selection member 26 are disposed at positions that can be operated with the thumb of the right hand.

An image sensor (image pickup element) 90 is a CMOS sensor that converts captured optical information into a signal, and is a so-called 35 mm full-size image sensor having an effective area of approximately 24 mm×36 mm.

A lens mount portion 28 is a portion through which a detachable lens (not illustrated) is attached to the image pickup apparatus 1. A communication terminal 20 is provided inside the lens mount portion 28, and communication is made between the image pickup apparatus 1 and the lens via the communication terminal 20.

In a case where the lens is attached to the image pickup apparatus 1, a holding lock (not illustrated) works. Pressing the lock button 27 can unlock the holding lock mechanism and the lens can be detached. The lock button 27 is disposed near the lateral side of the radial center portion of the lens mount portion 28.

The image pickup apparatus 1 is attachable to and detachable from a wide variety of lenses, such as a so-called full-size compatible lens that can expose the entire effective area of approximately 24 mm×36 mm on the image sensor 90, and a so-called APS-C compatible lens that is a formatted lens having a small exposure area.

A user can hang and carry the image pickup apparatus 1 by inserting a string member (not illustrated) such as a strap through strap insertion members 40 and 41.

Figure 2:
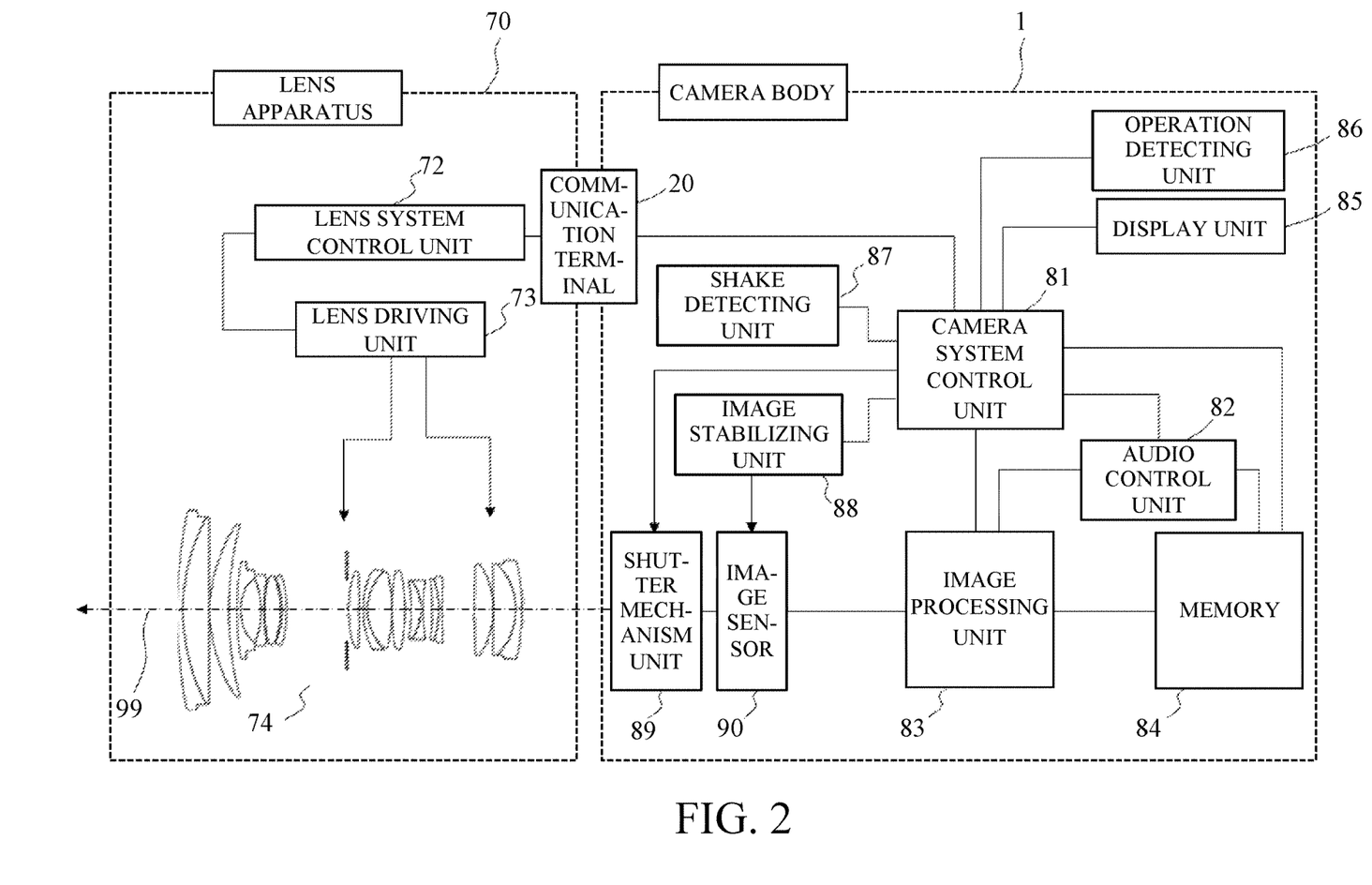
FIG. 2 is a block diagram for explaining the image pickup apparatus according to the first embodiment.

Referring now to FIG. 2, a description will be given of the configuration of the image pickup apparatus 1 according to this embodiment. FIG. 2 is a block diagram for explaining the image pickup apparatus 1.

As an example of the image pickup apparatus 1, a lens interchangeable type camera in which a lens apparatus 70 is attached to a camera body will be described. The lens apparatus 70 includes an imaging optical system 74 including a plurality of lenses and an aperture stop. An optical axis 99 is an optical axis of the imaging optical system 74. The lens apparatus 70 further includes a lens system control unit 72 and a lens driving unit 73. The lens system control unit 72 controls the entire lens apparatus 70. The lens apparatus 70 can communicate with a control unit in the camera body of the image pickup apparatus 1 via the communication terminal 20. The lens driving unit 73 controls the driving of a focus lens, a zoom lens, the aperture stop, and the like.

The camera body of the image pickup apparatus 1 includes a camera system control unit 81 and the image sensor 90. The camera system control unit 81 controls the entire image pickup apparatus 1. The image sensor 90 receives light from an object via the imaging optical system 74 and a shutter mechanism unit 89, and outputs an electrical signal through photoelectric conversion. The image processing unit 83 acquires an image signal output from the image sensor 90 and executes image processing such as development processing. Image data after the image processing is stored in a memory (storage unit) 84.

An image stabilizing unit 88 corrects blur of a captured image. A shake detecting unit 87 detects shake of the image pickup apparatus caused by camera shake or the like. The shutter mechanism unit 89 is disposed on the object side of the image sensor 90 and used to control the exposure time.

The shake detecting unit 87 can detect rotation around the optical axis 99, and detects rotational blur of the image pickup apparatus 1 in a pitch direction, a yaw direction, and a roll direction. Shake detection is performed using, for example, a gyro sensor as the shake detecting unit 87, and a shake detecting signal is output to the camera system control unit 81.

The camera system control unit 81 governs the control of the image pickup apparatus 1 and the lens apparatus 70 according to the operation signal detected by the operation detecting unit 86. The camera system control unit 81 includes a Central Processing Unit (CPU), which executes a predetermined program to perform various processing in the imaging system.

The image stabilizing unit 88 performs image stabilization according to a control command from the camera system control unit 81. The image stabilizing unit 88 moves (drives) the image sensor 90 within a plane orthogonal to the optical axis 99.

A description will now be given of the operation of the image pickup apparatus 1. Light from the object forms an image on an imaging plane of the image sensor 90 via the imaging optical system 74. A focus evaluation amount and an exposure amount are obtained from the output signal of the image sensor 90, and optical adjustment processing of the imaging optical system 74 is executed based on this information. That is, the image sensor 90 is properly exposed, and an imaging signal corresponding to the object image is output from the image sensor 90.

The shutter mechanism unit 89 performs light shielding control for the image sensor 90 by moving a shutter curtain 42 (FIG. 1A). The shutter mechanism unit 89 has a light shielding member (mechanical rear curtain), and the exposure to the image sensor 90 is completed by the shutter mechanism unit 89. In the image sensor 90, the processing of the electronic front curtain is performed before the shutter mechanism unit 89 moves the rear curtain. This is control processing of the exposure start timing by resetting the charges for each line. In the electronic front curtain mode, exposure control is performed by synchronizing the charge reset operation of the image sensor 90 with the movement of the rear curtain of the shutter mechanism unit 89. Since the technology of the electronic front curtain is well-known, a detailed description thereof will be omitted.

The image processing unit 83 includes an A/D converter, a white balance adjustment circuit, a gamma correction circuit, an interpolation calculation circuit, and the like. For example, the image processing unit 83 generates color image data by applying color interpolation (demosaicing) processing to the Bayer array signals obtained from the image sensor 90 and outputs recording image data to the memory 84. The image processing unit 83 performs data compression for still images and moving images. An audio control unit 82 compresses audio data to be recorded. The audio data compressed by the audio control unit 82 is combined into a moving image and a still image by the image processing unit 83, and then output to the memory 84. The memory 84 has a nonvolatile memory and stores various data including image data. The camera system control unit 81 performs processing for storing data in the memory 84 and processing for outputting data read out of the memory 84 to a display unit 85 and presenting the data to the user. The display unit 85 in FIG. 2 corresponds to the display unit 2 and the non-finder display unit 4 in FIGS. 1A and 1B.

The camera system control unit 81 controls imaging processing, image processing, recording/playback processing, etc. according to the user operation signal. For example, the operation detecting unit 86 detects pressing of the shutter release button. A first switch is turned on by half-pressing the shutter release button. In a case where the user fully presses the shutter release button, a second switch is turned on. In a case where the camera system control unit 81 receives an imaging instruction from the operation detecting unit 86 according to the operation of the second switch, the camera system control unit 81 performs driving control of the image sensor 90, image processing, compression processing, etc. and further performs control to display image information on the screen of the display unit 2. The operation detecting unit 86 detects, for example, an operation of the touch panel 3 (FIG. 1B) provided on the rear surface of the camera, and transmits an operation instruction of the user to the camera system control unit 81.

The camera system control unit 81 is connected to the image processing unit 83 and calculates a proper focus position and F-number based on the signal from the image sensor 90. That is, the camera system control unit 81 performs photometry and focus state detection based on the output signal from the image sensor 90, and determines an exposure condition (F-number, shutter speed, etc.). The camera system control unit 81 performs exposure control of the image sensor 90 through aperture control and shutter control. The camera system control unit 81 transmits a command signal to the lens system control unit 72 via the communication terminal 20. The lens system control unit 72 controls the lens driving unit 73 according to the command signal from the camera system control unit 81.

Controlling the operation of each component of the image pickup apparatus 1 according to the operation of the user can capture a still image and a moving image. In a case where the user instructs imaging of a still image or a moving image using the operation member of the image pickup apparatus 1, the camera system control unit 81 controls the imaging operation according to the operation signal from the operation detecting unit 86. The camera system control unit 81 calculates a target value based on the detection signal from the shake detecting unit 87 and controls driving of the image stabilizing unit 88. In other words, the camera system control unit 81 is responsible for generating the target value based on the detection signal of the shake detecting unit 87 and driving control of the image stabilizing unit 88. At that time, the camera system control unit 81 controls the image stabilizing operation according to the imaging condition, the exposure condition, and the like.

A brief description will be given of a driving control flow of the image stabilizing unit 88. A first switch operation (S1 operation) is performed by the user, and the operation detecting unit 86 detects this operation to start the imaging preparation operation. Image stabilization is performed by the image stabilizing unit 88 in order to facilitate the composition determination of the user during the so-called aiming operation for determining the composition. That is, the image sensor 90 is driven (moved or rotated) under the control of the image stabilizing unit 88 based on the detection signal of the shake detecting unit 87. Thereafter, a second switch operation (S2 operation) is performed by the user, and the operation detecting unit 86 detects this operation, and the imaging operation (image recording operation) is started. At this time, the image sensor 90 is driven under the control of the image stabilizing unit 88 based on the detection signal of the shake detecting unit 87 in order to suppress image blur of the object image acquired by the exposure operation. The image stabilizing operation is stopped a predetermined time after the exposure.

Referring now to FIGS. 3 to 7, a description will be given of the configuration of the image pickup apparatus 1 as an electronic apparatus according to this embodiment. FIGS. 3 to 7 illustrate only components necessary for the description of this embodiment.

Figure 3:
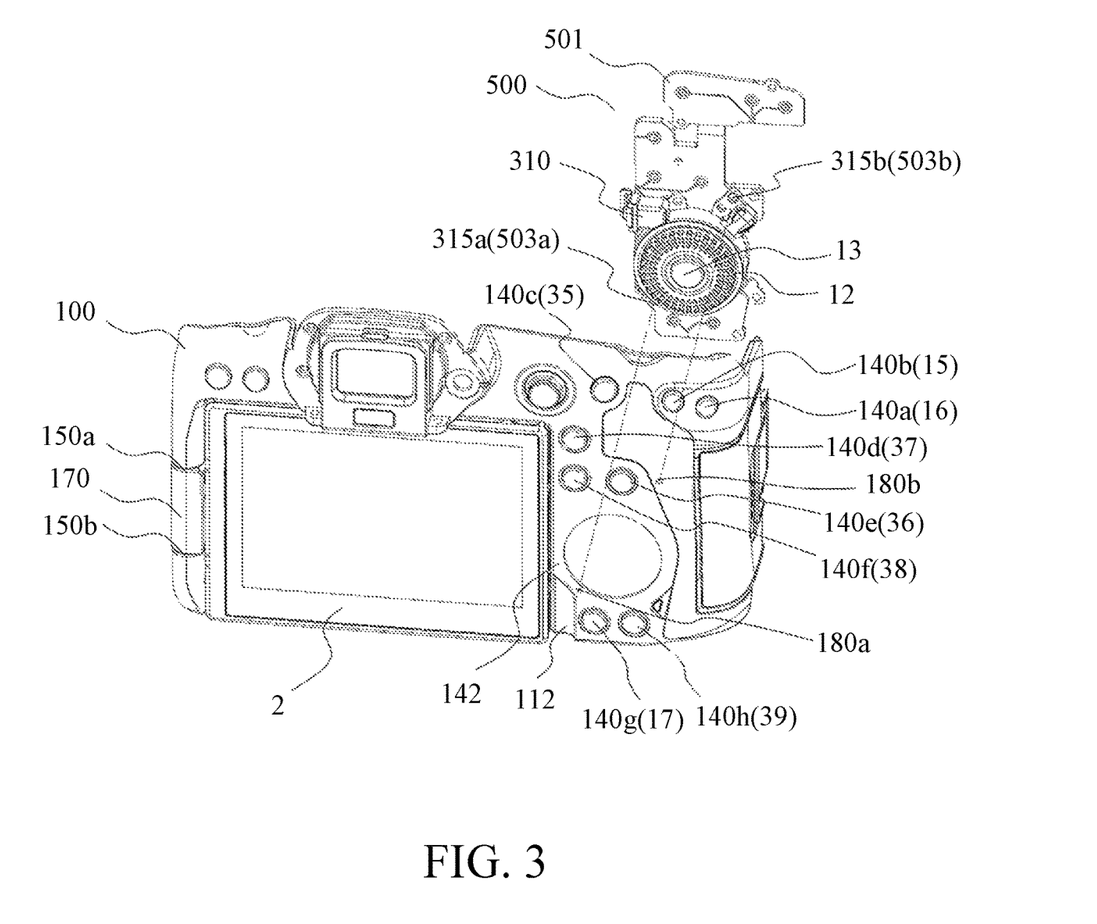
FIG. 3 is an exploded perspective view for explaining the image pickup apparatus according to the first embodiment.

FIG. 3 is an exploded perspective view for explaining the image pickup apparatus 1 according to this embodiment.

The rear cover 100 is a member made of die-casting magnesium alloy, has high rigidity, and is an exterior member on the rear side of the image pickup apparatus 1.

The display unit 2 includes a so-called variable angle mechanism that is configured as rotatable. A hinge portion 170 of the display unit 2 is held by support portions 150a and 150b of the rear cover 100 so that the display unit 2 is rotatably supported.

The rear cover 100 has a concave portion 112 that the finger of the user rests on in rotating the display unit 2. The concave portion 112 is recessed from each of the display unit 2 and an operation portion surface 142 of the rear cover 100.

The rear cover 100 has a structure in which operation members such as buttons 140a to 140h and the operation dial 12 are disposed. The buttons 140a to 140h are elastic members formed by resin molding, and have contacts (not illustrated) made of conductive rubber. The operation dial 12 is a rotary operation member and has the SET button 13 at the center. The SET button 13 has a contact (not illustrated) made of conductive rubber.

The operation dial 12 is rotatably supported on a dial base member 310. The operation dial 12 has an unillustrated terminal brush, which contacts a dial pattern 513 formed on a circuit member 500, which will be described below, and slides on the dial pattern 513 due to a rotating operation.

The rear cover 100 has bosses 180a and 180b. The bosses 180a and 180b are inserted into positioning holes 315a and 315b of the dial base member 310 so that the operation dial 12 can be positioned. The bosses 180a and 180b are also inserted into positioning holes 503a and 503b formed in a base portion 501 of the circuit member 500, and the circuit member 500 is positioned, fastened, and fixed with unillustrated screws.

Figure 4A:
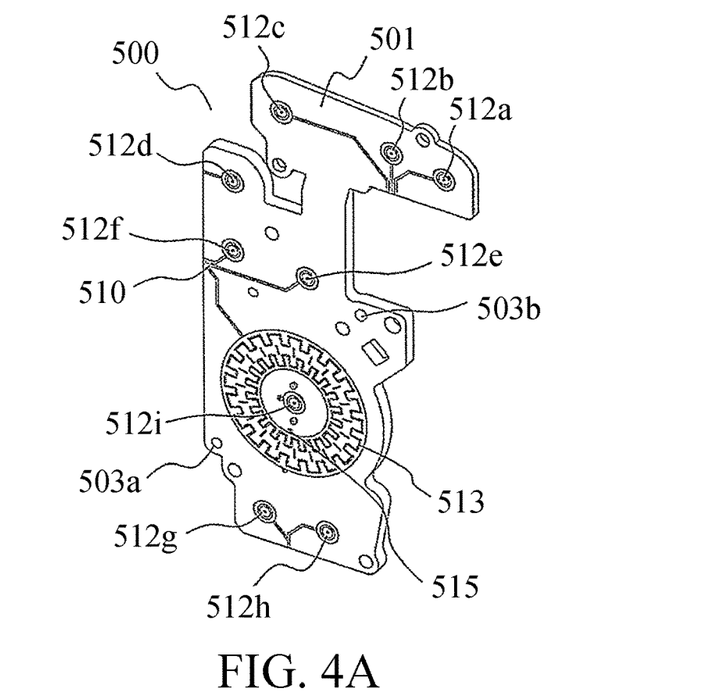
FIGS. 4A to 4C are perspective views for explaining circuit members according to the first embodiment.
Figure 4B:
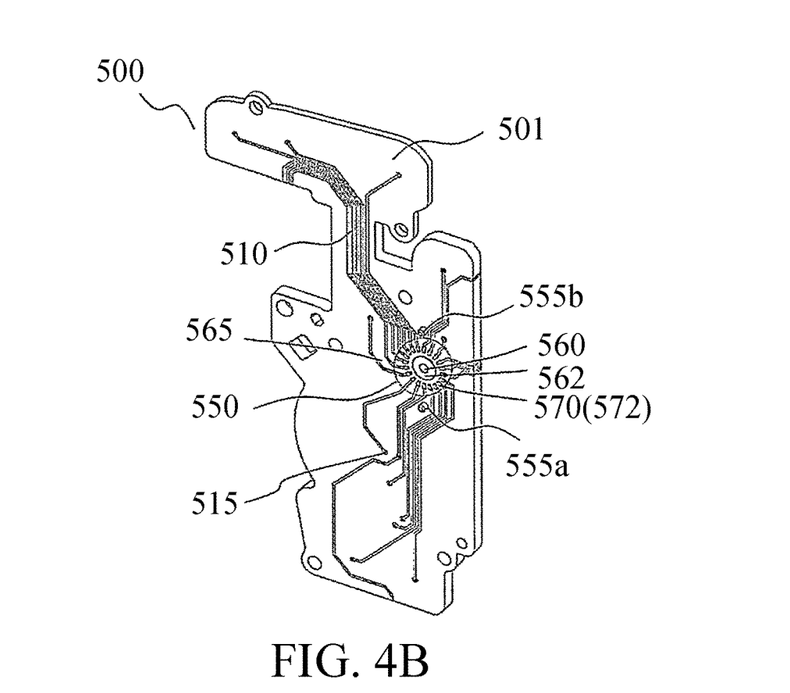
Figure 4C:
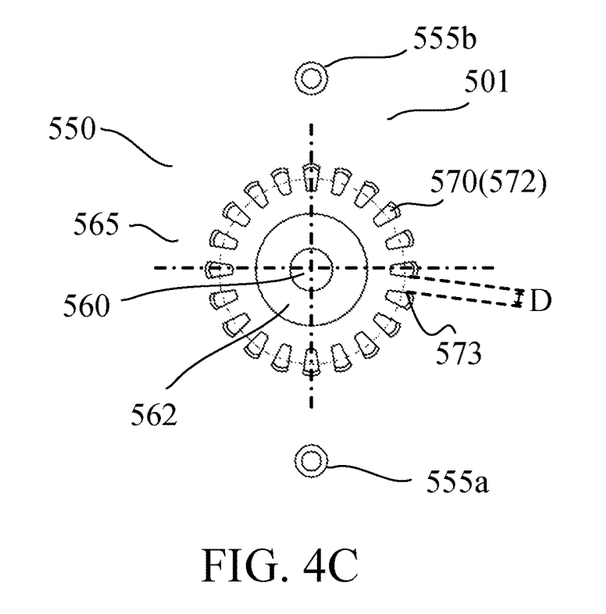

FIGS. 4A to 4C are perspective views explaining the circuit member 500. FIG. 4A is a perspective view of the circuit member 500 viewed obliquely from the back, FIG. 4B is a perspective view of the circuit member 500 viewed obliquely from the front, and FIG. 4C explains a contact portion 550 of the circuit member 500.

The base portion 501 of the circuit member 500 is a member formed by resin molding using a resin material, and has high rigidity. Patterned wiring 510, which is a conductive pattern, is directly formed on the surface of the base portion 501 by the MID technology to form an electric circuit. The MID technology is a technology for forming a pattern by irradiating a predetermined portion of a base material with a laser beam and applying metal plating only to the laser-irradiated portion.

The base portion 501 of the circuit member 500 has switch contact patterns 512a to 512i at positions opposite to contacts (not illustrated) of the buttons 140a to 140h (FIG. 3) and the SET button 13. Metal plating is exposed on the switch contact patterns 512a to 512i, and in a case where the contacts of the buttons 140a to 140h and the SET button 13 contact the switch contact patterns 512a to 512i, the switching-on is electrically detected. The dial pattern 513 is in a state where metal plating is exposed, and is a contact pattern that contacts a terminal brush (not illustrated) formed on the operation dial 12 (FIG. 3). In a case where the operation dial 12 is rotated, the terminal brush slides on the dial pattern 513 and the rotation of the operation dial 12 is detected by a combination of conduction signals between the terminal brush and the dial pattern 513.

A through hole 515 is formed in the base portion 501. A pattern can be formed over the front and back of the base portion 501 by applying metal plating using the MID technology to the inner wall surface of the hole formed by molding or punching the base portion 501.

The switch contact patterns 512a to 512i and the dial pattern 513 can be wired in a desired path by forming the patterned wiring 510 on the surface of the base portion 501 by metal plating.

The electrical signal on the base portion 501 of the circuit member 500 is gathered to the contact portion 550 by the patterned wiring 510 and transmitted to the FPC 600, which is electrically connected to the contact portion 550 and will be described below.

Referring now to FIG. 4C, a detailed description will be given of the contact portion 550 of the circuit member 500.

A screw hole 560 is formed in the base portion 501, and a screw seat (convex-shaped portion) 562 projecting from a surface 565 of the base portion 501 is formed around the screw hole 560. The screw hole 560 will be referred to as a fastened portion, but the fastened portion may include the screw seat 562 formed around the screw hole 560. A plurality of convex portions 570 are arranged in a circular shape at regular intervals from the screw hole 560. In other words, the plurality of convex portions 570 are formed in a circular shape on the base portion 501 around the screw hole 560 as a center. Here, the plurality of convex portions 570 may be formed in an approximately circular shape at approximately regular intervals from the screw hole 560. Each convex portion 570 has a shape protruding from the surface 565 of the base portion 501. Metal plating is formed on the surfaces of the convex portions 570 by the MID technology to form a contact pattern (first contact pattern) 572. The contact pattern 572 is connected to the patterned wiring 510 described above, and they are electrically connected to each other.

Bosses 555a and 555b are formed on the contact portion 550, and used for positioning with the FPC 600 described below.

In the contact portion 550, the number of convex portions 570 is the number of connectable signals. Since the convex portions 570 are arranged in the circular shape at regular intervals from the screw hole 560, a distance between the convex portions 570 becomes narrower as the number of the convex portions 570 increases. The contact portion 550 has a cut portion 573 formed on each convex portion 570 to secure a constant distance D between adjacent convex portions 570. This structure prevents contact short-circuiting between the convex portions 570 even if the number of the convex portions 570, that is, the number of connectable signals increases.

Figure 5:
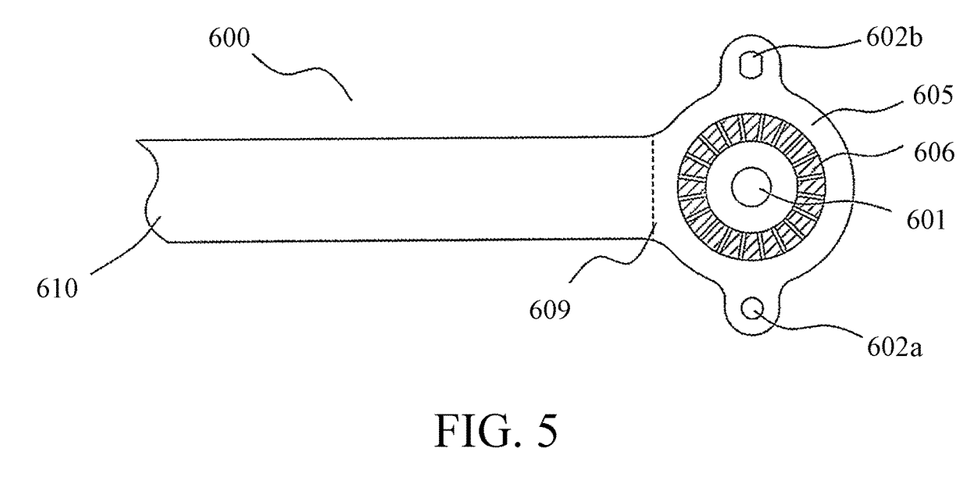
FIG. 5 explains a flexible printed circuit (FPC) according to the first embodiment.

FIG. 5 explains the FPC 600.

The FPC 600 is a flexible substrate in which a wiring pattern made of copper foil is sandwiched between a base film and a coverlay film using a film such as polyimide having an insulating property, and a thermosetting adhesive is used for bonding.

A hole portion 601 is formed in the FPC 600, and FPC contact patterns (second contact pattern) 606 are formed around it. The FPC contact pattern 606 is formed in which the coverlay film 605 is open to expose the copper foil. The FPC contact patterns 606 are arranged on the FPC 600 in a circular shape around the hole portion 601 as a center so that each of the FPC contact patterns 606 faces a corresponding one of the contact patterns 572. The FPC contact pattern 606 contacts and is electrically connected to the contact portion 550 of the circuit member 500 described above, and thereby an electric signal is transmitted between them. The FPC contact pattern 606 is wired to an end 610 of the FPC 600 by an unillustrated wiring pattern, and an electric signal is transmitted to an unillustrated substrate.

Positioning holes 602a and 602b are formed in the FPC 600. A reinforcing member (reinforcing portion) 609 is formed on the opposite side of the FPC contact patterns 606. The reinforcing member 609 is a member made of polyimide, glass epoxy resin, or the like, and is formed at least in an area where the FPC contact patterns 606 are formed.

Figure 6A:
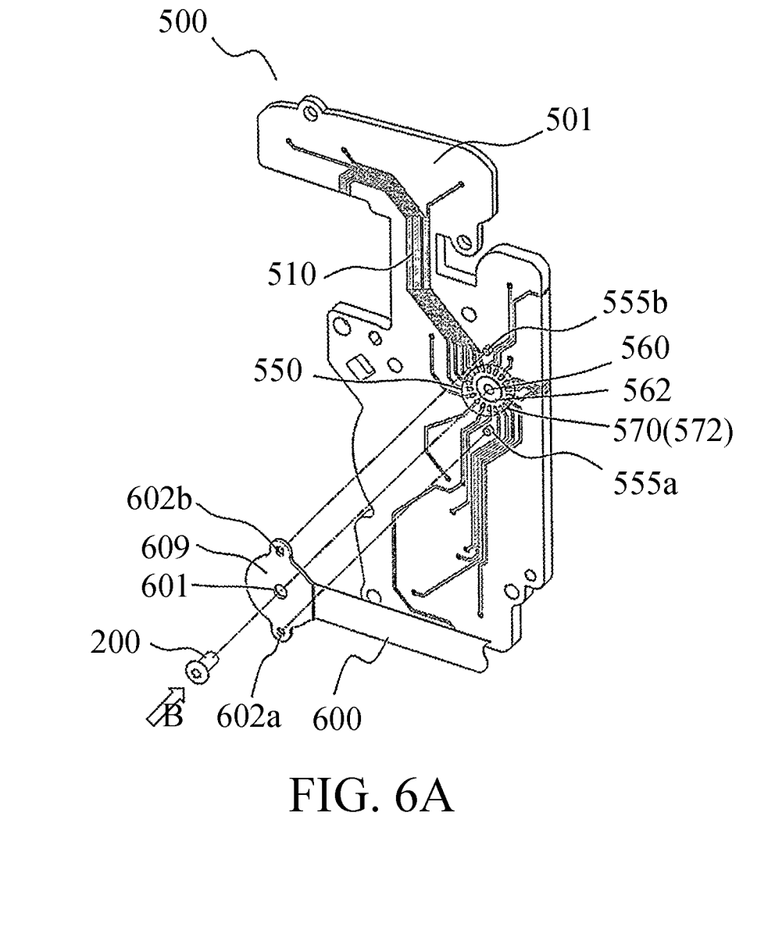
FIGS. 6A and 6B explain a circuit member and the FPC according to the first embodiment.
Figure 6B:
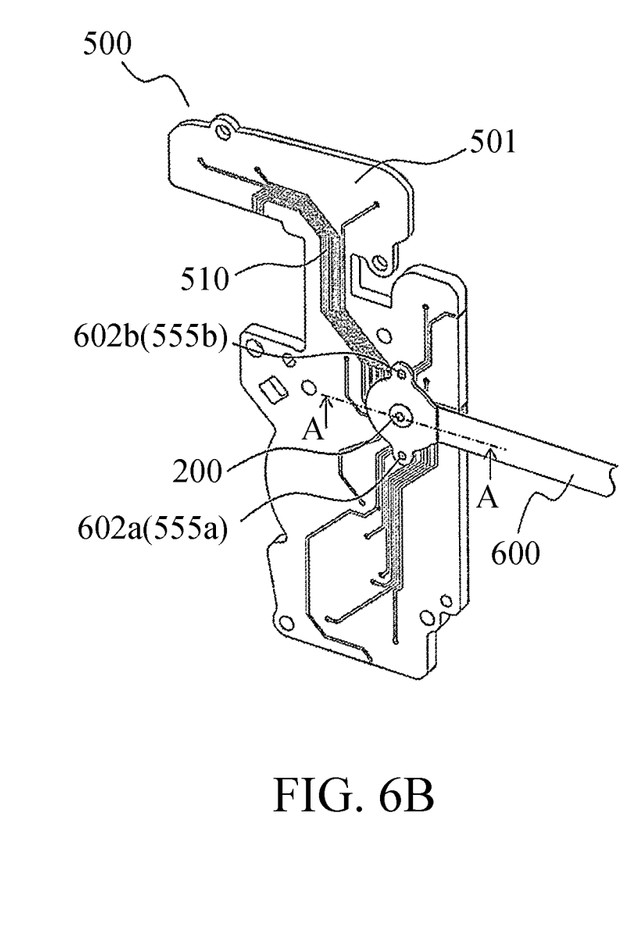

FIGS. 6A and 6B explain the circuit member 500 and the FPC 600. FIG. 6A is a perspective view illustrating the structures of the circuit member 500 and the FPC 600, and FIG. 6B is a perspective view explaining a connection state between the circuit member 500 and the FPC 600.

The base portion 501 of the circuit member 500 has the bosses 555a and 555b. Inserting the bosses 555a and 555b into the positioning holes 602a and 602b of the FPC 600 from an arrow B direction can position the circuit member 500 and the FPC 600. In addition, a single screw (fastening member) 200 is inserted into the hole portion 601 in the FPC 600 in the arrow B direction, and fastened to the screw hole 560 in the base portion 501 in the arrow B direction. Thereby, the FPC 600 is fastened and fixed to the circuit member 500. A positioning mechanism includes the bosses 555a and 555b as engaging portions formed on the base portion 501 and positioning holes 602 as engaged portions formed in the FPC 600. The positioning holes 602a and 602b may be formed in the base portion 501 and bosses 555a and 555b may be formed in the FPC 600. Thus, the positioning mechanism is made by providing the engaging portion to one of the base portion 501 and the FPC 600 and providing the engaged portion to the other.

By fastening and fixing the FPC 600 and the base portion 501 of the circuit member 500 using the screw 200, the FPC contact patterns 606 of the FPC 600 and the contact patterns 572 of the circuit member 500 are brought into contact with one another and electrically connected. Thereby, each electric signal is transmitted.

Figure 7:
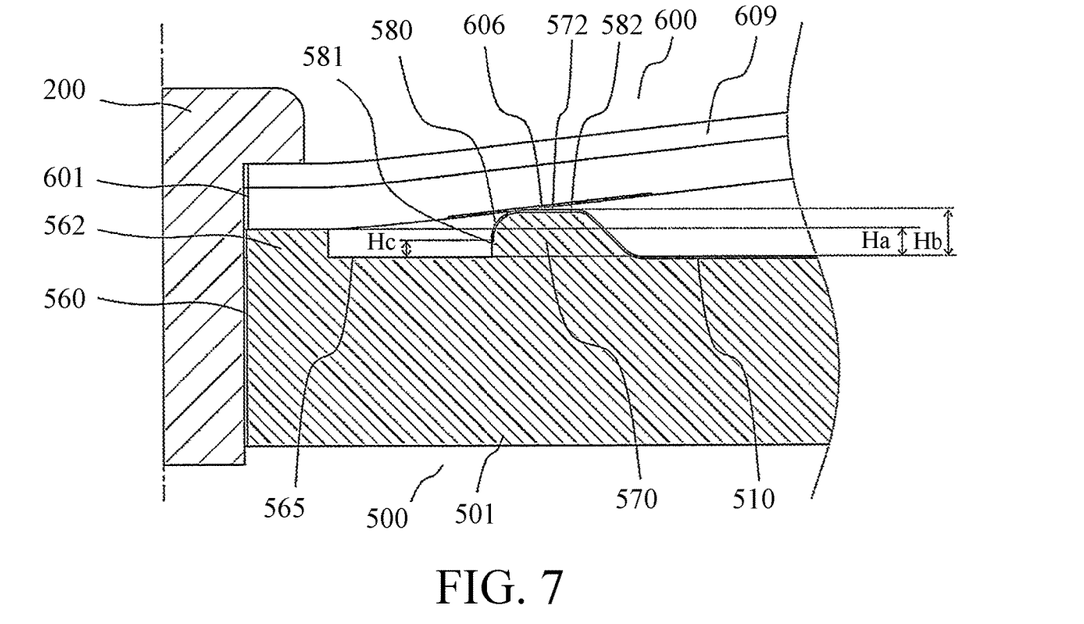
FIG. 7 is a sectional view for explaining a connection state between a circuit member and the FPC according to the first embodiment.

FIG. 7 is a sectional view for explaining a connection state between the circuit member 500 and the FPC 600. FIG. 7 illustrates a section taken along a line A-A in FIG. 6B.

As described above, the base portion 501 of the circuit member 500 has the screw seat 562 protruding from the surface 565. The convex portions 570 protrude from the surface 565. The contact patterns 572 are formed on the convex portions 570 by metal plating using the MID technology, and connected to the patterned wiring 510. The FPC contact patterns 606 are formed on the FPC 600 at positions facing the contact patterns 572.

The FPC 600 is fastened and fixed to the circuit member 500 as a result of that the screw 200 is inserted into the hole portion 601 in the FPC 600 and fastened to the screw hole 560 in the base portion 501. The FPC contact patterns 606 of the FPC 600 and the contact patterns 572 of the circuit member 500 come into contact with each other by fastening and fixing the FPC 600 and the base portion 501 through the screw 200.

At this time, a height Hb from the surface 565 of a vertex portion 582 of the convex portion 570 projecting from the surface 565 is higher than a height Ha from the surface 565 of the screw seat 562 projecting from the surface 565.

Each convex portion 570 includes an R-shaped portion 580 having a curved shape in a direction (radial direction) separating from the central screw hole 560. Each contact pattern 572 is formed from an R-shaped portion end 581 of the R-shaped portion 580 to the vertex portion 582. A height Hc from the surface 565 of the base portion 501 to the R-shaped portion end 581 is lower than the height Ha of the screw seat 562 projecting from the surface 565.

Due to this positional relationship and fastening the FPC 600 to the base portion 501 using the screw 200, the FPC contact patterns 606 of the FPC 600 are pressed against the contact patterns 572 of the convex portions 570.

Each of the plurality of FPC contact patterns 606 and the plurality of convex portions 570 is arranged in a circular shape at regular intervals from the screw hole 560. Under this structure, by fastening and fixing the FPC 600 and the circuit member 500 through the screw 200 at the center of this circle, the contacts can be brought into contact with each other with uniform contact pressure, and the FPC 600 and the circuit member 500 can be stably connected.

The structure described above enables the contacts to be brought into contact with each other with uniform contact pressure and the FPC 600 and the circuit member 500 to be stably connected.

Since an incorporating direction of the FPC 600 and the fastening direction of the screw 200 are the same directions with respect to the circuit member 500, the incorporation is easy and no complicated mechanical device is necessary even in a case where the embodiment is applied to a robot-automated assembly device.

In this embodiment, there are the plurality of convex portions 570 at the contact portion 550 but, for example, three convex portions 570 may be arranged at intervals of approximately 120 degrees as long as the plurality of convex portions 570 are arranged in a circular shape at regular intervals from the screw hole 560 located at the center.

Second Embodiment

Figure 8:
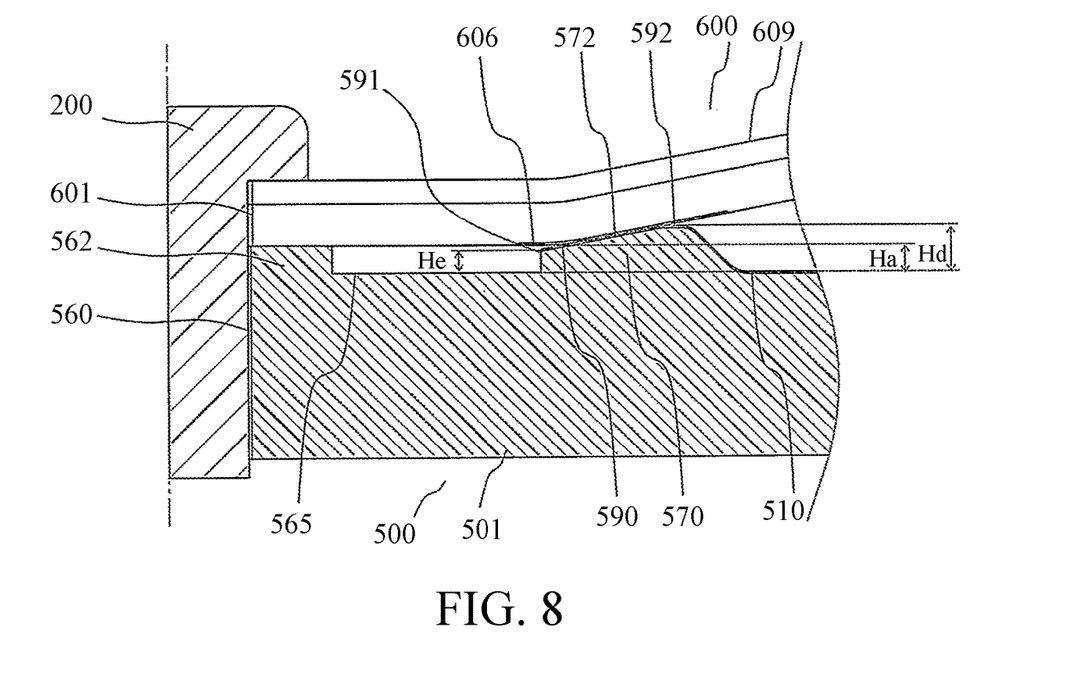
FIG. 8 is a sectional view for explaining a connection state between a circuit member and an FPC according to a second embodiment.

Referring now to FIGS. 6A, 6B, and 8, a description will be given of a second embodiment. In the description of the second embodiment, a description of matters common to those of the first embodiment will be omitted, and differences from the first embodiment will be mainly described.

FIG. 8 is a sectional view for explaining a connection state between the circuit member 500 and the FPC 600 according to this embodiment. FIG. 8 illustrates a section taken along the line A-A in FIG. 6B.

The screw seat 562 protruding from the surface 565 is formed on the base portion 501 of the circuit member 500. The convex portions 570 protrude from the surface 565. The contact patterns 572 are formed on the convex portions 570 by metal plating using the MID technology, and connected to the patterned wiring 510. Each of the FPC contact patterns 606 is formed on the FPC 600 at a position facing a corresponding one of the contact patterns 572.

The single screw 200 is inserted into the hole portion 601 in the FPC 600 and fastened to the screw hole 560 in the base portion 501 to fasten and fix the FPC 600 to the circuit member 500. The FPC contact patterns 606 of the FPC 600 and the contact patterns 572 of the circuit member 500 contact each other by fastening and fixing the FPC 600 and the base portion 501 using the screw 200.

At this time, a height Hd from the surface 565 of a vertex portion 592 of the convex portion 570 projecting from the surface 565 is higher than a height Ha from the surface 565 of the screw seat 562 projecting from the surface 565.

Each convex portion 570 includes a tilted portion 590 having a tilted shape in a direction (radial direction) separating from the central screw hole 560. The contact pattern 572 is formed from a tilted portion end 591 of the tilted portion 590 to the vertex portion 592. A height He from the surface 565 of the base portion 501 to the tilted portion end 591 is lower than the height Ha of the screw seat 562 projecting from the surface 565.

Due to this positional relationship and fastening the FPC 600 to the base portion 501 using the screw 200, the FPC contact patterns 606 of the FPC 600 are pressed against the contact patterns 572 of the convex portions 570.

Each of the plurality of FPC contact patterns 606 and the plurality of convex portions 570 is arranged in a circular shape at regular intervals from the screw hole 560. Under this configuration, by fastening and fixing the FPC 600 and the circuit member 500 through the screw 200 at the center of this circle, the contacts can be brought into contact with each other with uniform contact pressure, and the FPC 600 and the circuit member 500 are stably connected.

The structure described above enables the contacts to be brought into contact with each other with uniform contact pressure and the FPC 600 and the circuit member 500 to be stably connected.

Third Embodiment

Referring now to FIGS. 9 to 12, a third embodiment will be described below. In the description of the third embodiment, a description of matters common to those of the first embodiment will be omitted, and differences from the first embodiment will be mainly described.

Figure 9:
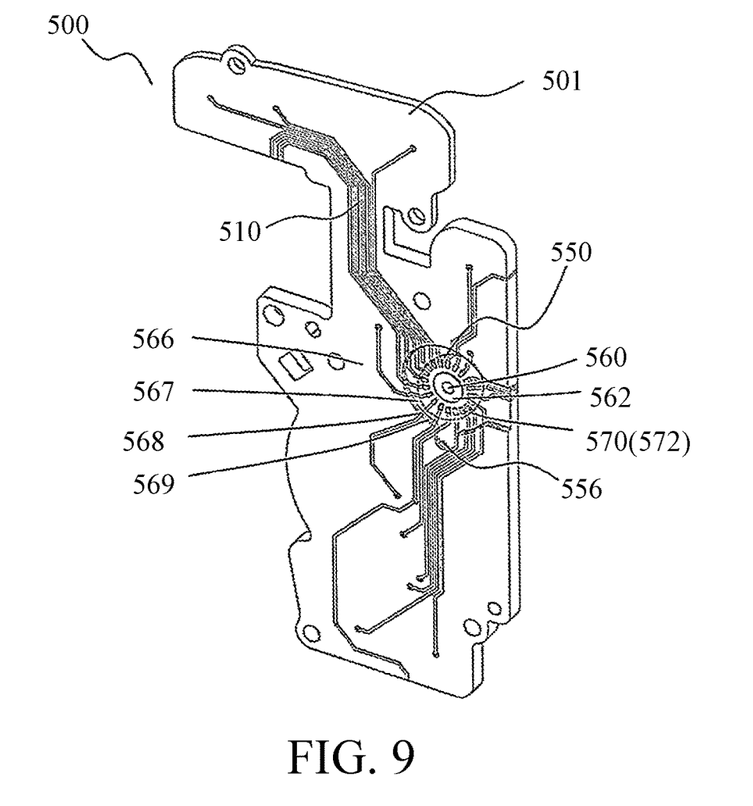
FIG. 9 is a perspective view for explaining a circuit member according to a third embodiment.

FIG. 9 is a perspective view of the circuit member 500 according to this embodiment viewed from the rear.

A base portion 501 of the circuit member 500 is a member formed by resin molding and has high rigidity. Patterned wiring 510 is formed on the surface of the base portion 501 by the MID technology to form an electric circuit.

The patterned wiring 510 is formed by metal plating on the first surface 566 of the base portion 501 of the circuit member 500 and is wired along a desired path.

A second surface 567 recessed from the first surface 566 is formed on the base portion 501. A contact portion 550 is formed on the second surface 567. An electrical signal on the base portion 501 of the circuit member 500 is gathered to the contact portion 550 by the patterned wiring 510 and transmitted to the FPC 600 electrically connected to the contact portion 550.

There is formed a wall portion 568 forming a step between the first surface 566 and the second surface 567, and the wall portion 568 has a C-shaped surface 569.

The screw hole 560 is formed in the contact portion 550, and the screw seat 562 projecting from the second surface 567 of the base portion 501 is formed around the screw hole 560. A plurality of circular convex portions 570 are formed in a circle shape at regular intervals from the screw hole 560. That is, the screw hole 560, the screw seat 562, and the plurality of convex portions 570 are formed on the second surface 567. Each convex portion 570 has a shape that protrudes from the second surface 567 of the base portion 501. Metal plating is formed on the surface of each convex portion 570 by the MID technology to form a contact pattern 572. Each contact pattern 572 is connected to the patterned wiring 510 described above, and they are electrically connected to each other.

The second surface 567 has a shape 556, and the shape 556 is a notch shape in which part is cut out. The shape 556 is used for positioning with the FPC 600, which will be described below.

Figure 10:
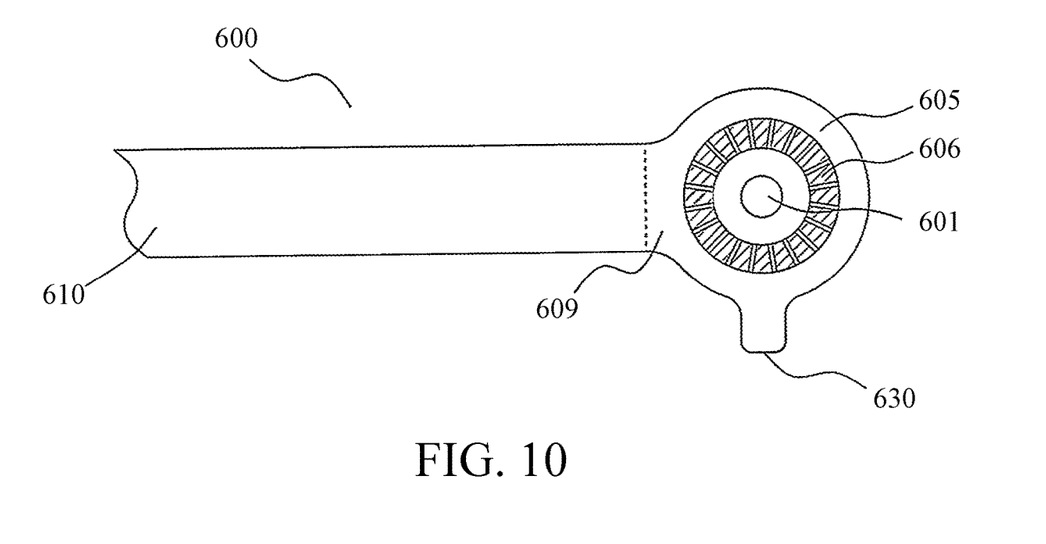
FIG. 10 explains an FPC according to the third embodiment.

FIG. 10 explains the FPC 600 according to this embodiment.

The FPC 600 is a flexible substrate in which a wiring pattern made of copper foil is sandwiched between a base film and a coverlay film using a film such as a polyimide having an insulating property, and a thermosetting adhesive is used for bonding.

The hole portion 601 is formed in the FPC 600, and the FPC contact patterns 606 are formed around it. The FPC contact pattern 606 is formed in which the coverlay film 605 is open to expose the copper foil. The FPC contact patterns 606 contact and are electrically connected to the contact portion 550 of the circuit member 500 described above, and thereby an electric signal is transmitted between them. The FPC contact pattern 606 is wired to the end 610 of the FPC 600 by an unillustrated wiring pattern, and an electric signal is transmitted to an unillustrated substrate.

The FPC 600 has a convex portion (second convex portion) 630 that is used for positioning with the circuit member 500 and has approximately the same shape as the notch shape 556. A positioning mechanism includes the notch shape 556 and the convex portion 630. The reinforcing member (reinforcing portion) 609 is formed on the opposite side of the FPC contact patterns 606. The reinforcing member 609 is a member made of polyimide, glass epoxy resin, or the like, and is formed at least in an area where the FPC contact patterns 606 are formed.

Figure 11A:
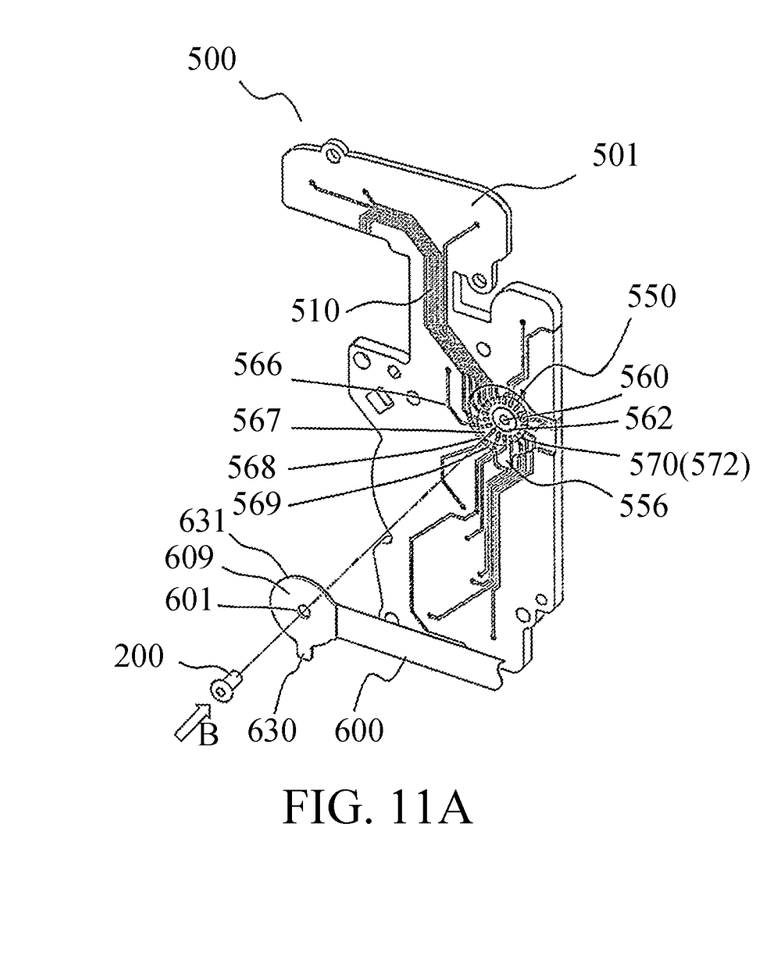
FIGS. 11A and 11B explain the circuit member and the FPC according to the third embodiment.
Figure 11B:
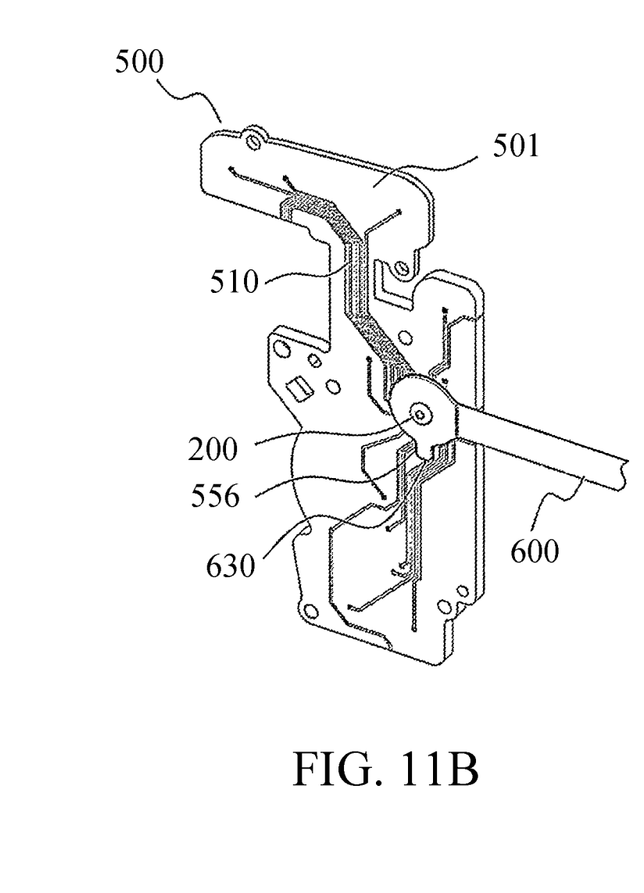

FIGS. 11A and 11B explain the circuit member 500 and the FPC 600 of this embodiment. FIG. 11A is a perspective view illustrating the structures of the circuit member 500 and the FPC 600 in this embodiment, and FIG. 11B is a perspective view for explaining a connection state between the circuit member 500 and the FPC 600 in this embodiment.

An outer edge portion 631 of the FPC 600, which has approximately the same shape as that of the wall portion 568, is guided by the C-shaped surface 569 and is located at a predetermined position. At this time, the convex portion 630 of the FPC 600 is accommodated within the shape 556 formed on the second surface 567 of the base portion 501, and a position in the rotational direction around the hole portion 601 is determined. The single screw 200 is inserted into the hole portion 601 in the FPC 600 in the arrow B direction and fastened to the screw hole 560 in the base portion 501 in the arrow B direction. Thereby, the FPC 600 is fastened and fixed to the circuit member 500.

By fastening and fixing the FPC 600 and the base portion 501 using the screw 200, the FPC contact patterns 606 of the FPC 600 and the contact patterns 572 of the circuit member 500 are brought into contact with one another and electrically connected. Thereby, each electric signal is transmitted.

Figure 12:
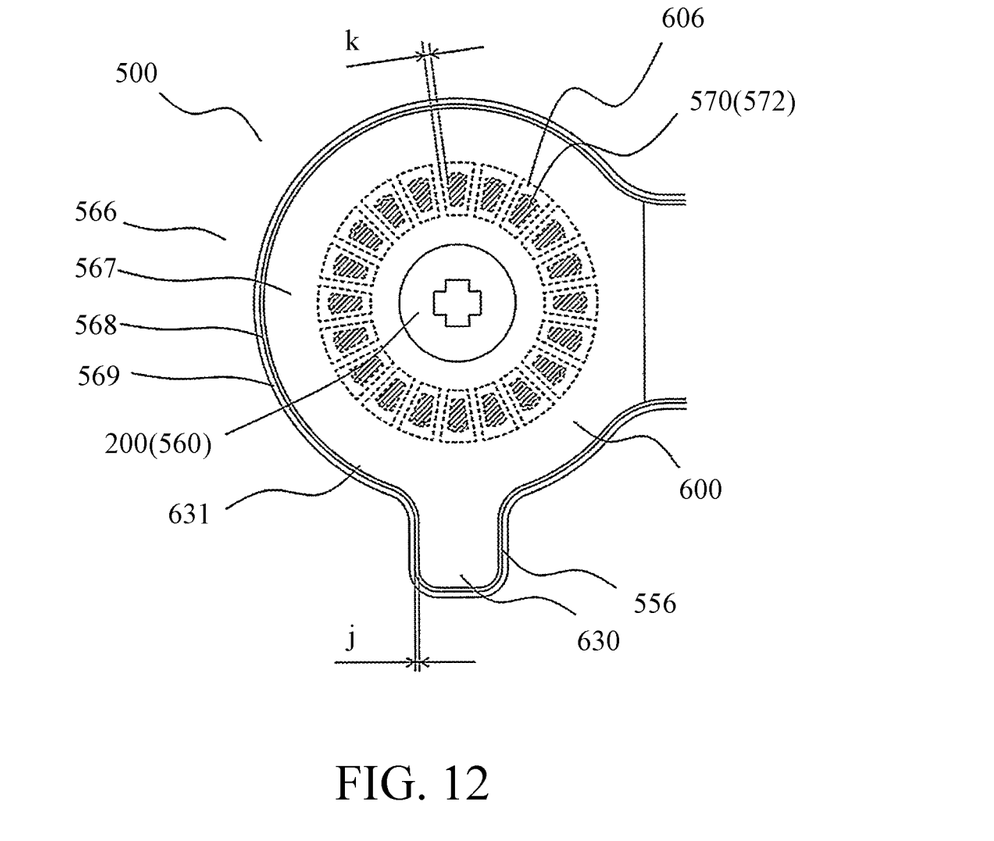
FIG. 12 explains a connection state between the circuit member and the FPC according to the third embodiment.

FIG. 12 explains a connection state between the circuit member 500 and the FPC 600 in this embodiment.

Due to the structure described above, the outer edge portion 631 of the FPC 600 is accommodated within the wall portion 568 formed on the base portion 501 of the circuit member 500, and the convex portion 630 is accommodated within the shape 556 formed on the second surface 567 of the base portion 501. Thereby, the position in the rotational direction around the hole portion 601 as a center is determined. At this time, there is a distance j between the wall portion 568 of the shape 556 formed on the base portion 501 and the convex portion 630 of the FPC 600.

By fastening and fixing the FPC 600 and the circuit member 500 using the screw 200, the FPC contact patterns 606 of the FPC 600 and the contact patterns 572 of the circuit member 500 are brought into contact with one another. At this time, the FPC contact patterns 606 covers the contact patterns 572. There is a distance k between an edge of the FPC contact pattern 606 and an edge of the contact pattern 572 in the rotating direction around the hole portion 601 as a center and the distance j is smaller than the distance k.

Due to the above structure, in a case where the FPC 600 is fastened and fixed to the base portion 501 using the screw 200, even if the FPC 600 is rotated, it falls within a moving amount of the distance j. Therefore, it is possible to prevent a problem of disconnection between the FPC 600 and the circuit member 500.

The incorporating direction of the FPC 600 and the fastening direction of the screw 200 are the same directions with respect to the circuit member 500. In addition, the C-shaped surface 569 has an inviting (guiding) shape. Thus, the incorporation is easy and no complicated mechanical device is necessary even in a case where this embodiment is applied to a robot-automated assembly device.

Each of the above embodiment can provide an electronic apparatus having a contact structure that can make contact with uniform contact pressure using a simple structure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-198575, filed on Dec. 7, 2021, which is hereby incorporated by reference herein in its entirety.

What is claimed is:

1. An electronic apparatus using the Molded Interconnect Device technology comprising:
    a circuit member;
    a substrate; and
    a fastening member that fixes the substrate to the circuit member,
    wherein the circuit member includes:
        a base portion having a conductive pattern;
        a fastened portion provided on the base portion, to which the fastening member is fixed; and
        a plurality of convex portions arranged in an approximately circular shape around the fastened portion as a center on the base portion,
    wherein each of the plurality of convex portions has a first contact pattern,
    wherein the substrate has a hole portion into which the fastening member is inserted,
    wherein the substrate has a plurality of second contact patterns arranged in an approximately circular shape on the substrate around the hole portion as a center so that each of the second contact patterns faces a corresponding one of the first contact patterns, and
    wherein the first contact patterns and the second contact patterns are brought into contact with each other by fixing the fastening member to the fastened portion through the hole portion.

2. The electronic apparatus according to claim 1, further comprising a positioning mechanism that positions the substrate to the circuit member,
    wherein the positioning mechanism includes:
        an engaging portion provided on one of the base portion and the substrate; and
        an engaged portion provided on the other of the base portion and the substrate, and engaged with the engaging portion so as to position the substrate to the circuit member.

3. The electronic apparatus according to claim 1, wherein the substrate includes a reinforcing portion in an area where the plurality of second contact patterns are formed.

4. The electronic apparatus according to claim 1, wherein the fastened portion includes a convex-shaped portion formed on the base portion, and
    wherein the first contact pattern formed on each of the plurality of convex-shaped portions is higher than the convex portions.

5. The electronic apparatus according to claim 4, wherein the fastening member is a screw, and
    wherein the fastened portion includes:
        a screw hole formed in the base portion; and
        the convex-shaped portion formed around the screw hole.

6. The electronic apparatus according to claim 1, wherein each of the plurality of convex portions has a curved shape extending in a radial direction from a center of the approximately circular shape around the fastened portion as the center.

7. The electronic apparatus according to claim 1, wherein the plurality of convex portions have a tilted shape in a radial direction from the center of the approximately circular shape around the fastened portion as the center.

8. The electronic apparatus according to claim 1, wherein the plurality of convex portions includes at least three convex portions.

9. The electronic apparatus according to claim 1, wherein the base portion includes:
    a first surface;
    a second surface that is concave relative to the first surface; and
    a wall portion formed between the first surface and the second surface,
    wherein the conductive pattern is directly formed on the first surface,
    wherein the second surface includes the fastened portion and the plurality of convex portions, and
    wherein the substrate includes an outer edge portion that has approximately the same shape as that of the wall portion.

10. The electronic apparatus according to claim 9, wherein the wall portion has a C-shaped surface, and
    wherein the outer edge portion is guided by the C-shaped surface and is accommodated in the second surface.

11. The electronic apparatus according to claim 9, wherein the second surface has a notch shape,
    wherein the substrate has a second convex portion having approximately the same shape as the notch shape, and
    wherein the substrate is positioned to the circuit member as a result of that the second convex portion is accommodated in the notch shape.

12. The electronic apparatus according to claim 11, wherein the second contact patterns contact the first contact patterns so as to cover the first contact patterns, and
    wherein a distance between a wall portion of the notch shape and the second convex portion is shorter than a distance in a rotating direction around the hole portion as a center between an end of the second contact pattern and an end of the first contact pattern corresponding to the end of the second contact pattern.

13. The electronic apparatus according to claim 1, wherein the fastening member is a single fastening member.

14. The electronic apparatus according to claim 1, wherein an incorporating direction of the substrate and a fastening direction of the fastening member are the same directions with respect to the circuit member.

\* \* \* \* \*